March 10, 1936. W. J. LARKIN, JR 2,033,343
TRANSMISSION DEVICE
Filed Jan. 30, 1933 2 Sheets-Sheet 1
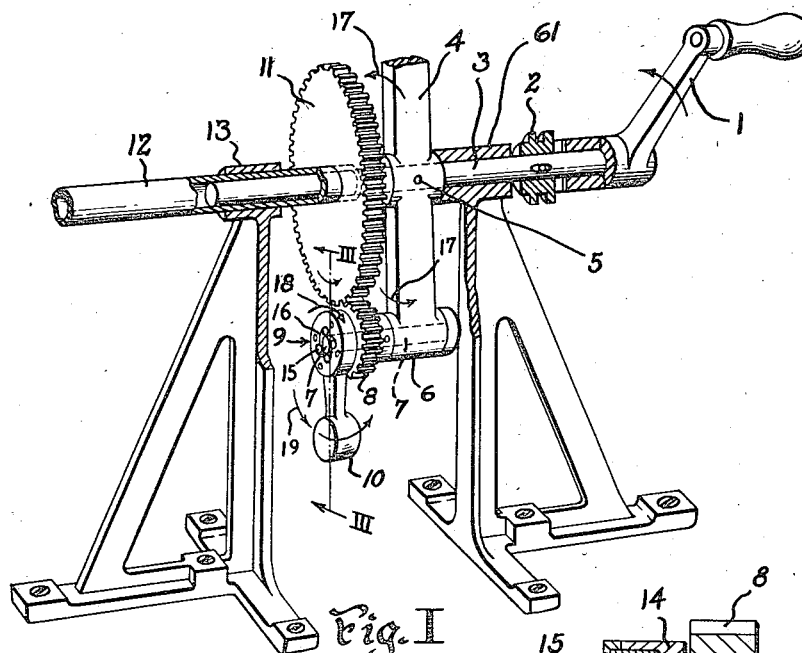
Fig. I
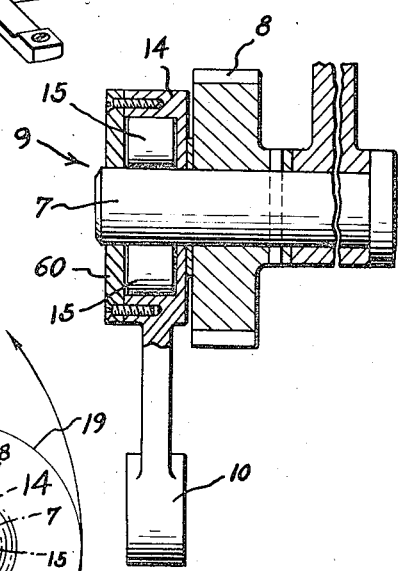
Fig. III
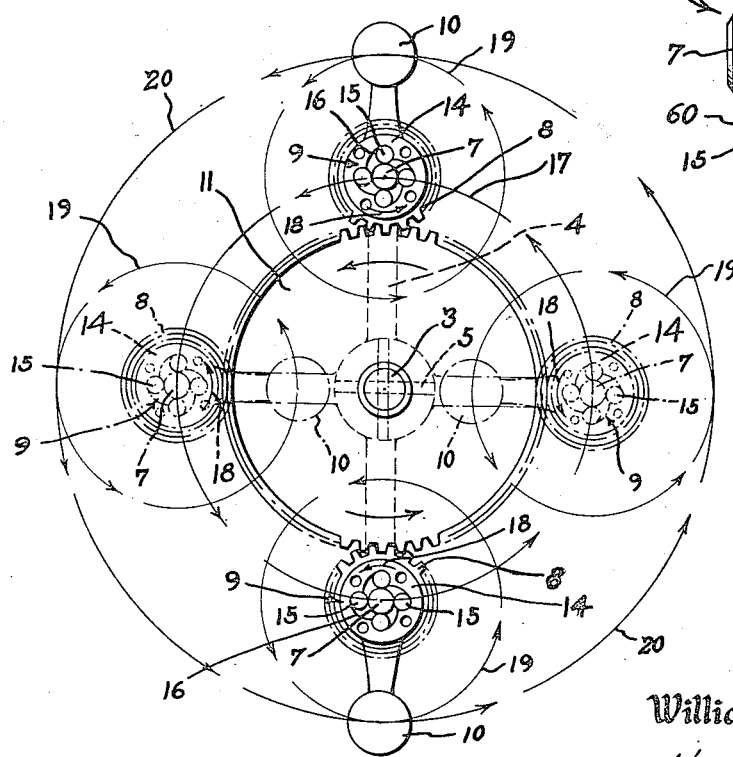
Fig. II
INVENTOR
William James Larkin Jr.
BY
Harry H. Styll
ATTORNEY

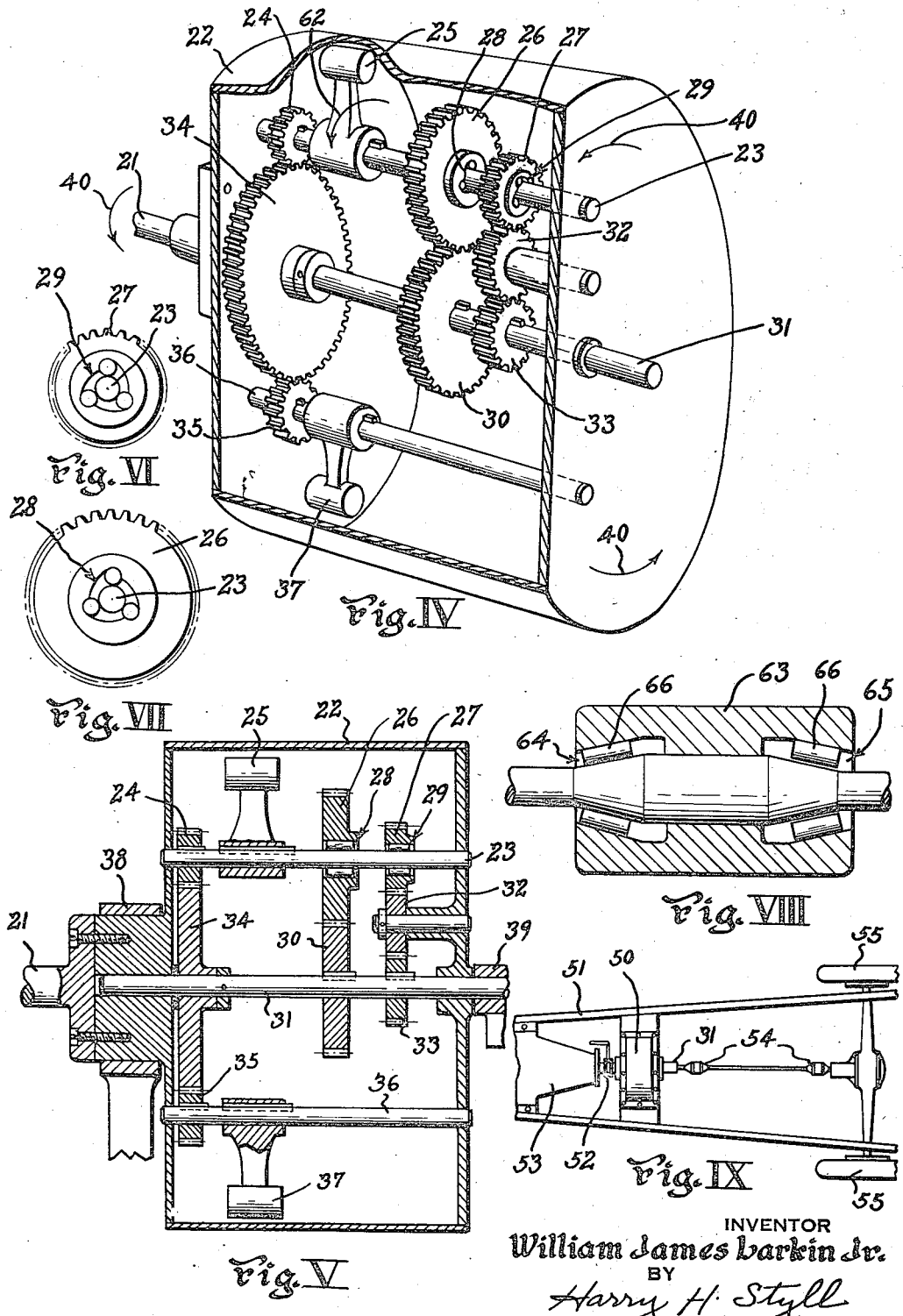

Patented Mar. 10, 1936

2,033,343

UNITED STATES PATENT OFFICE 2,033,343

TRANSMISSION DEVICE

William James Larkin, Jr., Cambridge, Mass., assignor of one-third to Philip Annable Coleman, Melrose, and one-third to Elmer Weldon Schumacher, Southbridge, Mass.

Application January 30, 1933, Serial No. 654,195

10 Claims. (Cl. 74—260)

This invention relates to power transmission devices and more particularly to a device for equalizing the speed between a driving member and a member to be driven thereby.

One of the principal objects of the invention is to provide means whereby the speed between a driving member and a member to be driven thereby is gradually increased towards or brought to a point of equalization.

Another object of the invention is to provide means for connecting movable members which are to have relative speeds under varying load conditions.

Another object of the invention is to provide means for connecting a power member which is being driven at a constant speed and constant power output to a member to which it is desired to apply varying loads without slowing the constant speed member.

Another object of the invention is to provide means controlled by centrifugal force to transfer motion from one member of a transmission device to another.

Another object of the invention is to provide simple, efficient and economical means of producing continuous and uniform acceleration of a driven member.

Another object of the invention is to provide means whereby a member to be driven may be operated from stand-still to the same speed as a driving member with a smooth gradual pick-up.

Another object of the invention is to provide means for coupling up with a driven member before it acquires the speed of its driving member.

Another object of the invention is to provide means whereby the means acted upon by centrifugal force will be automatically released when the speed of the driven member exceeds the speed of the drive member.

Another object of the invention is to provide means whereby the action of the centrifugal force means in either direction will impart a smooth and gradual pick-up of the driven member.

Other objects are to provide power transmission means of this character that may be operable without a clutch connection between the drive shaft and the power engine or power means, to provide means therein by which the direction of the driven means may be reversed and to provide means by which full speed ahead may be reversed to full speed in the opposite direction without danger to said transmission mechanism by means of a continuous and uninterrupted acceleration in either direction.

Other objects and advantages of the invention will become apparent from the following description taken in connection with the accompanying drawings. It will be apparent that many changes in the details of construction and arrangement of parts may be made without departing from the spirit of the invention as expressed in the accompanying claims. I therefore do not wish to be limited to the exact arrangements shown and described as the preferred forms only have been shown by way of illustration.

Referring to the drawings:

Fig. I is a perspective view of a diagrammatic illustration of one form of the invention.

Fig. II is a diagrammatic illustration of the operation of the speed generating means.

Fig. III is an enlarged sectional view on line III—III of Fig. I.

Fig. IV is a perspective view, partly in section of a modified form of the invention.

Fig. V is a vertical cross section through Fig. IV.

Fig. VI is a side elevation of the roller clutch arrangement of one of the drive members.

Fig. VII is a view similar to Fig. VI showing the roller clutch arrangement of another of the drive members.

Fig. VIII is a fragmentary cross sectional view of the reverse clutch arrangement.

Fig. IX is a partial plan view showing the invention applied to an automobile.

In the past, as is well known mechanical gear shifts have been operated upon the principle of changing the gear ratios. This method was slow, noisy and difficult to operate, and also was liable to damage due to the intermeshing of moving gears. It is a principal object of this invention to provide means which will overcome these difficulties and provide a smooth and even acceleration without shifting moving gears.

Referring to the drawings wherein similar reference characters denote corresponding parts throughout:

In Fig. I the source of power is designated by a crank 1. This source of power may be any suitable means, such as an electric motor, a power engine, or manually operated means. The source of power 1 is shown connected, although it may be dispensed with, through a suitable clutch connection 2 with the drive shaft 3 which is rotated at the desired speed by the source of power 1, and is connected to a supporting arm 4 by the lock means 5. The arm 4 is provided adjacent its ends with the bearings 6 in which are rotatably mounted the shafts 7 each having a gear 8 keyed thereto. On the shaft 7 adjacent the gear 8 is mounted a roller clutch member 9 having an eccentric weight 10 thereon. The member 9 is adapted upon rotation of the shaft 7 in one direction to revolve the weight 10, and upon rotation in the opposite direction to release the weight to prevent rotation thereof. This action takes place through the roller clutch 9.

The gear 8 is in constant mesh with a gear 11 mounted on a tubular shaft 12 in the bearing 13. The shaft 12 is connected to means not shown adapted to be operated from stand-still to the speed of the drive shaft 3. This shaft 12 is adapted to carry the load, for example in an automobile, it is connected to the drive wheels.

The shafts 3 and 12 are in axial alignment with each other. The shaft 3, as shown in Fig. I, is in telescoped relation with shaft 12. The shaft 12 in this instance forms a bearing for the shaft 3 adjacent one end, the opposite end of the shaft 3 being supported in a suitable bearing 61.

The two ends of the support 4 are provided with identical means 8, 9 and 10, or if desired a plurality of such units may be mounted about the periphery of the gear 11; also, if desired, a plurality of such interrelated gears 8 and 11 may be provided on the shafts 3 and 12.

The roller clutch arrangement 9 comprises, as shown in Figs. II and III, a housing 14 having a plurality of rollers 15 loosely mounted therein. The housing 14 is provided with a plurality of cam surfaces 16 adapted to force the rollers 15 into frictional engagement with the shaft 7 when said shaft is rotated in one direction. The rollers 15 are held in the housings 14 by means of a plate 60. The rotation of the shaft 7 in the opposite direction will tend to release this frictional engagement.

The operation of this device is as follows:

Power is applied to the shaft 3. The support 4 will be rotated at the speed of the shaft 3 in the direction indicated by the arrows 17. This causes the gears 8 to rotate about the periphery of the gear 11. The gear 11 being connected with the load through the shaft 12, will be held against the rotating action of the gears 8 and will cause said gears to rotate about the axis of the shaft 7 in the direction indicated by the arrows 18. This causes the roller clutch 9 to frictionally connect the weight 10 to the shaft 7 and causes said weight to rotate in the path indicated by the arrows 19. As the speed of the weights 10 about the periphery of the gear 11 increases centrifugal force will tend to cause the weights to move outwardly away from the gear 11, tending to stop the rotary movement of the pinions 8 and cause said gears to rotate the gear 11 until the speed thereof gradually increases to the speed of the shaft 3, when the weights 10 will remain in an outward position and rotate in the path indicated by the arrows 20. This causes the weight 10, pinions 8 and gear 11 to rotate as a unit.

The roller clutch 9 is adapted upon rotation of the shaft 12 at a greater speed than the shaft 3 to release the weights 10 to allow the pinions 8 to idle around the gear 11, as for example, where an automobile is traveling faster than the speed of the motor, thus producing free wheeling. If the opposite condition exists the pinions 8 will automatically pick up the weights 10, and cause the speed of shaft 12 to gradually increase.

Referring to Figures IV to VII inclusive, there is illustrated a similar device which is dynamically and statically balanced. The drive shaft 21 is connected directly to a housing 22 carrying a shaft 23 on which is mounted a drive gear 24, eccentric weight 25, and gears 26 and 27. The drive gear 24 and weight 25 are keyed to the shaft 23. The gears 26 and 27 are provided with oppositely acting roller clutch means 28 and 29. The gear 26 is in constant mesh with a gear 30 keyed to the shaft 31 which is to be driven. This shaft 31 is connected to the load. The gear 27 is connected through an idler gear 32 to a gear 33 also keyed to the shaft 31. The drive gear 24 is in constant mesh with a gear 34 loosely mounted on the shaft 31. Diametrically opposed to the gear 24 is a drive gear 35 which is also in constant mesh with the gear 34. The gear 35 is keyed to shaft 36 having an eccentric weight 37 similar to the weight 25 and keyed on shaft 36. The purpose of the gear 34 is to maintain the weights 25 and 37 in predetermined relation with each other.

The operation of this device is as follows:

Where the housing 22 is rotated with the shaft 21 in suitable bearings 38 and 39 in the direction of arrow 40, the gear 26 which is in constant mesh with the gear 30, will be rotated about the periphery of said gear 30. The gear 30 which is held by the load connected to the shaft 31, will cause the gear 26 to rotate about the axis of the shaft 23. Rotary movement of the gear 26 about axis of shaft 23 will cause the roller clutch 28 to frictionally engage said gear and shaft and impart a rotary movement to the gear 24 and weight 25. The weight 25 when moving in an arc of 180 degrees from an upright position, as shown in Fig. IV, will be acted upon by centrifugal force which tends to retard its rotary movement. This retarding of the rotary movement of the weight 25 causes a driving action to be imparted to the gear 30 throughout the limits of said arc. When the weight moves beyond the 180 degree limit in a direction upwardly from its extreme lower position, it will automatically release the gear 26 and cause the roller clutch 29 to frictionally grip the gear 27 and impart a rotary movement to said gear in the opposite 180 degrees. The gear 27 which is connected through the idler gear 32 to the gear 33 on the shaft 31, will impart a direct drive to said shaft 31 in the same direction as that of the drive gears 26 and 30. This arrangement provides means whereby a direct drive is imparted to the shaft 31 throughout the 360 degree path of movement of the weight 25. It obviates any tendency of the weight to whip during its rotation and provides a device which is dynamically and statically balanced.

The weight 37 which is connected through the gearing 24, 34 and 35 to the weight 25 provides diametrically opposed means of balance which will remain in predetermined relation with each other and provide added means upon which the centrifugal force is active.

The structure of Fig. IV will impart a direct drive regardless of the path of movement of the weights 25 and 37. A plurality of weights 25 and 37 may be utilized if desired.

During the retarded movement of the weight 25 under the action of centrifugal force when it moves in a 180 degree path from its extreme upward position in one direction to its extreme lower position as indicated by arrow 62, the gear 27 will impart a driving action to shaft 31, and when the weight 25 continues in said path of movement from its extreme lower position throughout the opposite 180 degrees to its extreme upward position, the roller clutch 29 will automatically release the gear 27 and the roller clutch 28 will simultaneously cause the gear 26 to impart a drive to the shaft 31. This reversed action is a continuous operation throughout the cycle of movement. The arcs through which the above actions take place depend upon the ratios of the gears.

In Fig. VIII there is shown a double roller clutch arrangement which may be substituted for the roller clutches 9, 28 and 29, to permit reverse driving of the shafts 12 and 31. This comprises a housing 63 having oppositely tapered and oppositely acting roller races 64 and 65. The race 64 has a plurality of cam faces similar to those shown at 9, 28 and 29, which are adapted to frictionally force the rollers 66 into engagement with the shaft 7 or 23 as the case may be, on which the roller clutch is mounted when the said shaft is rotated in one direction, and the race 65 has a plurality of similar cam faces which are adapted to force the roller 66 into frictional engagement with the shaft when it is rotated in the opposite direction. The shaft in this instance is provided with a double tapered cam section which is moved longitudinally in the housing 63 to engage either of the roller clutches 64 or 65, as desired. This will permit shafts 12 and 31 to be driven in opposite directions as desired.

If desired, the clutch housing 63 may be made to shift sidewise on the shaft, instead of the shaft being shiftable in the housing.

In Fig. IX is shown the invention applied to an automobile wherein the unit in the housing 22 of Fig. IV, or the unit of Fig. I, is encased in a housing 50 on the chassis 51 and connected either with or without a clutch 52 to the motor 53. The shaft 31 is connected through couplings 54 to the drive wheels 55. This provides a smooth power transmission without a shift of gears.

It is not necessary to use a clutch between the power and the drive shaft because under normal conditions when the source of power is at low speed the weights will move free from the action of centrifugal force and will therefore not create any driving action; that is, the load created by a brake or the device itself will be sufficient to prevent a driving action and will merely cause the weights to idle. By merely speeding up the power the action of centrifugal force will be brought into action and the drive imparted as has been described above. This idling effect of the weights 25 and 37 will take place in a similar manner to that previously described when the speed of the member being driven exceeds the speed of the source of power, imparting a free wheeling action.

It is apparent that the direction of movement of the driven shafts 12 and 31 may be reversed by any known means, such as reversed gearing, if desired, it being only necessary to provide suitable means for shifting from one to the other.

It also will be understood that the speeds of the driving means and means to be driven may be varied as desired, and that the speed of the driven means does not necessarily have to be increased to that of the driving means.

From the foregoing it will be seen that I have provided simple, efficient, and economical means for accomplishing the objects of the invention and for obtaining the advantages thereof.

Having described my invention, I claim:

1. In a device of the character described the combination of driving means having a shaft rotatable in an eccentric path, a plurality of pinions loosely mounted on the shaft, an eccentric weight connected to the shaft, clutch means cooperating with each pinion and with the shaft for causing one of said pinions to rotate when the shaft is rotated in one direction and for allowing the other pinion to remain idle when the shaft is rotated in said direction and for automatically reversing said action during the rotary movement of the weight and means to be driven by the driving means comprising a shaft having gears attached thereto in constant intermeshed relation with the pinion and adapted during the rotary movement of the drive means and the movement of the eccentric shaft about the axis of the drive means to cause the pinion and weight to be rotated about the axis of said pinion and be simultaneously moved in a path about the axis of the gear to gradually and continuously impart a rotary movement to said gear until a speed is reached wherein centrifugal force will cause the weight to remain in an extreme outward position and rotate the pinion and gear as a unit.

2. In a device of the character described, driving means, means to be driven by said driving means and means for indirectly connecting the driving means with the means to be driven, said indirectly connecting means having weight means associated with and movable by the driving means in an eccentric path to be acted upon by centrifugal force generated by said driving means, and a plurality of sets of gearings having means associated therewith and with the weight means for automatically causing the weight means to alternatingly and effectively impart a continuous driving action to the means to be driven, said continuous driving action being imparted to the means to be driven by the responsive action of the weight means to centrifugal force, which action is transmitted to the means to be driven through one set of gearing throughout 180 degrees of the path of movement of the weight means and to the alternating and automatic transmission of the responsive action of the weight means to centrifugal force, which is transmitted to the means to be driven through the other set of gearing throughout the remaining 180 degrees of the path of movement of the weight means, said alternating and automatic action imparting a gradual and continuous accelerating action to the means to be driven.

3. In a device of the character described, driving means, means to be driven by said driving means, and means for indirectly connecting the driving means with the means to be driven, said indirectly connecting means having means associated with and movable by the driving means in an eccentric path to be acted upon by centrifugal force generated by said driving means and a plurality of sets of gearings having means associated therewith and with the means subject to the action of centrifugal force for alternatingly and successively causing said means subject to the action of centrifugal force to impart a continuous driving action to the means to be driven, said continuous driving action being imparted to the means to be driven by the responsive action of the means subject to the action of centrifugal force to said force, which action is transmitted to the means to be driven through one set of gearing throughout 180 degrees of the path of movement of said means subject to the action of centrifugal force and to the alternating and automatic transmission of the responsive action of the means subject to the action of centrifugal force to said force, which is transmitted to the means to be driven through the other set of gearing throughout the remaining 180 degrees of the path of movement of said means subject to the action of centrifugal force, said alternating and automatic action imparting a gradual and continuous accelerating action to the means to be driven.

4. In a device of the character described, driving means, means to be driven, a plurality of indirectly connecting members for connecting the driving means with the means to be driven, means associated with said indirectly connecting members operable by the driving means and subject to the action of centrifugal force generated by the driving means for imparting a driving action to the means to be driven through one of the connecting members throughout 180 degrees of the cycle of movement of the means subject to the action of centrifugal force and for imparting a driving action through the other of said connecting members throughout the remaining 180 degrees of the cycle of movement of said means subject to the action of centrifugal force, and means associated with said indirectly connecting members and with the means subject to the action of centrifugal force for successively and automatically transferring the driving action from one of the indirectly connecting members to the other during the movement of said means subject to the action of centrifugal force to impart a gradual and continuous accelerating action to the means to be driven throughout the cycle of movement of said means subject to the action of centrifugal force.

5. In a device of the character described, driving means, means to be driven by said driving means, means movable by the driving means in a predetermined path about a center offset from the center of rotation of said driving means and subject to the action of centrifugal force generated by said driving means, a plurality of connecting members associated with the means subject to the action of centrifugal force and with the means to be driven, means for operatively relating the connecting members and the means to be driven with the means subject to the action of centrifugal force throughout 180 degrees of the path of movement of said means, means for automatically releasing the first connecting member and for simultaneously causing the other connecting member to be operatively related with the means to be driven and with the means subject to the action of centrifugal force throughout the remaining 180 degrees of the cycle of movement of said means, said plurality of connecting members operating successively and automatically to impart a gradual and continuous accelerating action to the means to be driven throughout the cycle of movement of the means subject to the action of centrifugal force.

6. In a device of the character described, driving means, means to be driven by the driving means, weight means movable by the driving means in an eccentric path and subject to the action of centrifugal force generated by said driving means, a plurality of sets of gearings interrelating the means to be driven with the weight means, means for causing one set of gearing to transmit the responsive action of the weight means to centrifugal force to the means to be driven throughout 180 degrees of the cycle of movement of said weight and means for automatically releasing the first set of gearing and for automatically and simultaneously causing the other set of gearing to transmit the responsive action of the weight means to centrifugal force to the means to be driven throughout the remaining 180 degrees of the cycle of movement of said weight means, said gearings operating successively to impart a gradual and continuous accelerating action to the means to be driven throughout the cycle of movement of the weight means.

7. In a device of the character described, driving means, means to be driven by said driving means and means for indirectly connecting the driving means with the means to be driven, said indirectly connecting means having weight means associated with and movable by the driving means in an eccentric path to be acted upon by centrifugal force generated by said driving means, and a plurality of sets of gearings having means associated therewith and with the weight means for automatically causing the weight means to alternatingly and effectively impart a continuous driving action to the means to be driven, said continuous driving action being imparted to the means to be driven by the responsive action of the weight means to centrifugal force, which action is transmitted to the means to be driven through one set of gearing through 180 degrees of the path of movement of the weight means and to the alternating and automatic transmission of the responsive action of the weight means to centrifugal force, which is transmitted to the means to be driven through the other set of gearing throughout the remaining 180 degrees of the path of movement of the weight means, said alternating and automatic action imparting a gradual and continuous accelerating action to the means to be driven until a speed is generated wherein centrifugal force will prevent rotation of the weight means and cause the means to be driven to rotate at a speed equal to that of the driving means.

8. In a device of the character described, driving means, means to be driven by said driving means, and means for indirectly connecting the driving means with the means to be driven, said indirectly connecting means having means associated with and movable by the driving means in an eccentric path to be acted upon by centrifugal force generated by said driving means and a plurality of sets of gearings having means associated therewith and with the means subject to the action of centrifugal force for alternatingly and successively causing said means subject to the action of centrifugal force to impart a continuous driving action to the means to be driven, said continuous driving action being imparted to the means to be driven by the responsive action of the means subject to the action of centrifugal force to said force, which action is transmitted to the means to be driven through one set of gearing throughout 180 degrees of the path of movement of said means subject to the action of centrifugal force and to the alternating and automatic transmission of the responsive action of the means subject to the action of centrifugal force to said force, which is transmitted to the means to be driven through the other set of gearing throughout the remaining 180 degrees of the path of movement of said means subject to the action of centrifugal force, said alternating and automatic action imparting a gradual and continuous accelerating action to the means to be driven until a speed is generated wherein centrifugal force will prevent rotation of the means subject to the action of centrifugal force and cause the means to be driven to rotate at a speed equal to that of the driving means.

9. In a device of the character described, driving means, means to be driven thereby, a plurality of motion transfer couplings in cooperative relation with said driving means and means to be driven, and means operable by centrifugal force generated by the driving means having successively and directly operating means in cooperative relation therewith and with each motion transfer coupling to successively and automatically transmit a positive and direct driving motion to the means to be driven first through a positive and rigid connection with one motion transfer coupling and then through a positive and rigid connection with another coupling during the cycle of movement of the means operable by centrifugal force to gradually and continuously accelerate the means to be driven, the connection of each of said couplings with the means to be driven being alternately released during the driving action of the other coupling.

10. In a device of the character described, driving means, means to be driven thereby, a plurality of sets of gearings in cooperative relation with said driving means and means to be driven, and weight means operable by centrifugal force generated by the driving means having successively and directly operating means in cooperative relation therewith and with each set of gearings to successively and automatically transmit a positive and direct driving motion to the means to be driven first through a positive and rigid connection with one set of gearings and then through a positive and rigid connection with another set of gearings during the cycle of movement of the weight means under the action of centrifugal force to gradually and continuously accelerate the means to be driven, the connection of each of said couplings with the means to be driven being alternately released during the driving action of the other coupling.

WILLIAM JAMES LARKIN, Jr.